April 30, 1940.   D. A. ALEXANDER   2,198,693
PIPE STOCK
Filed Nov. 9, 1937   3 Sheets-Sheet 3
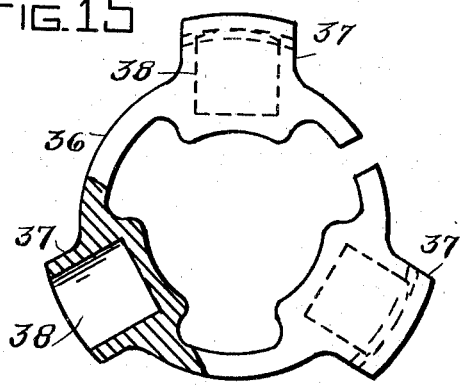
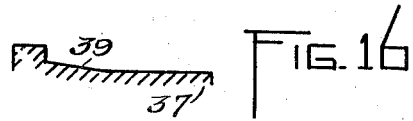
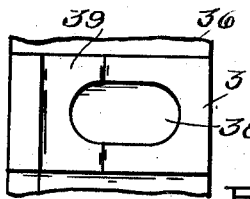
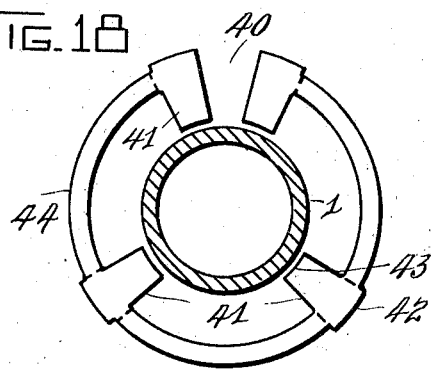
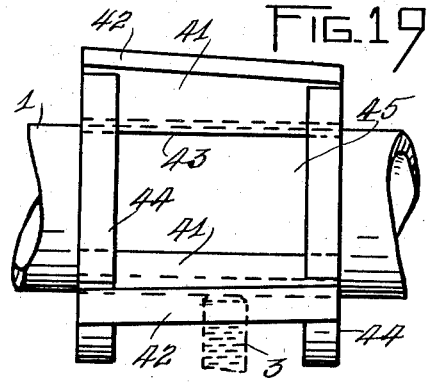
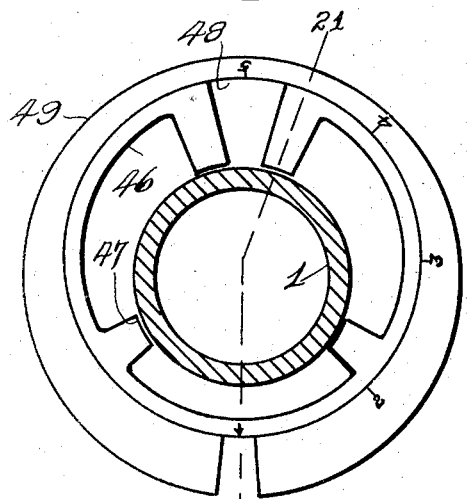
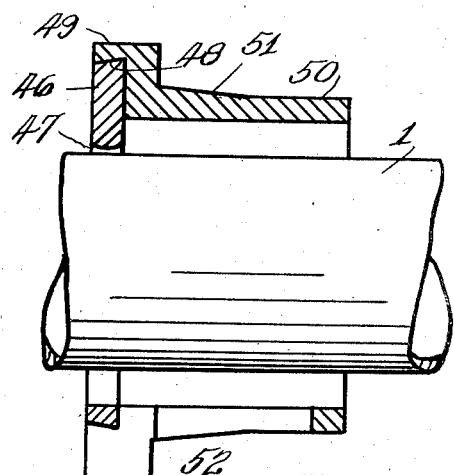
INVENTOR
D. A. Alexander Patented Apr. 30, 1940

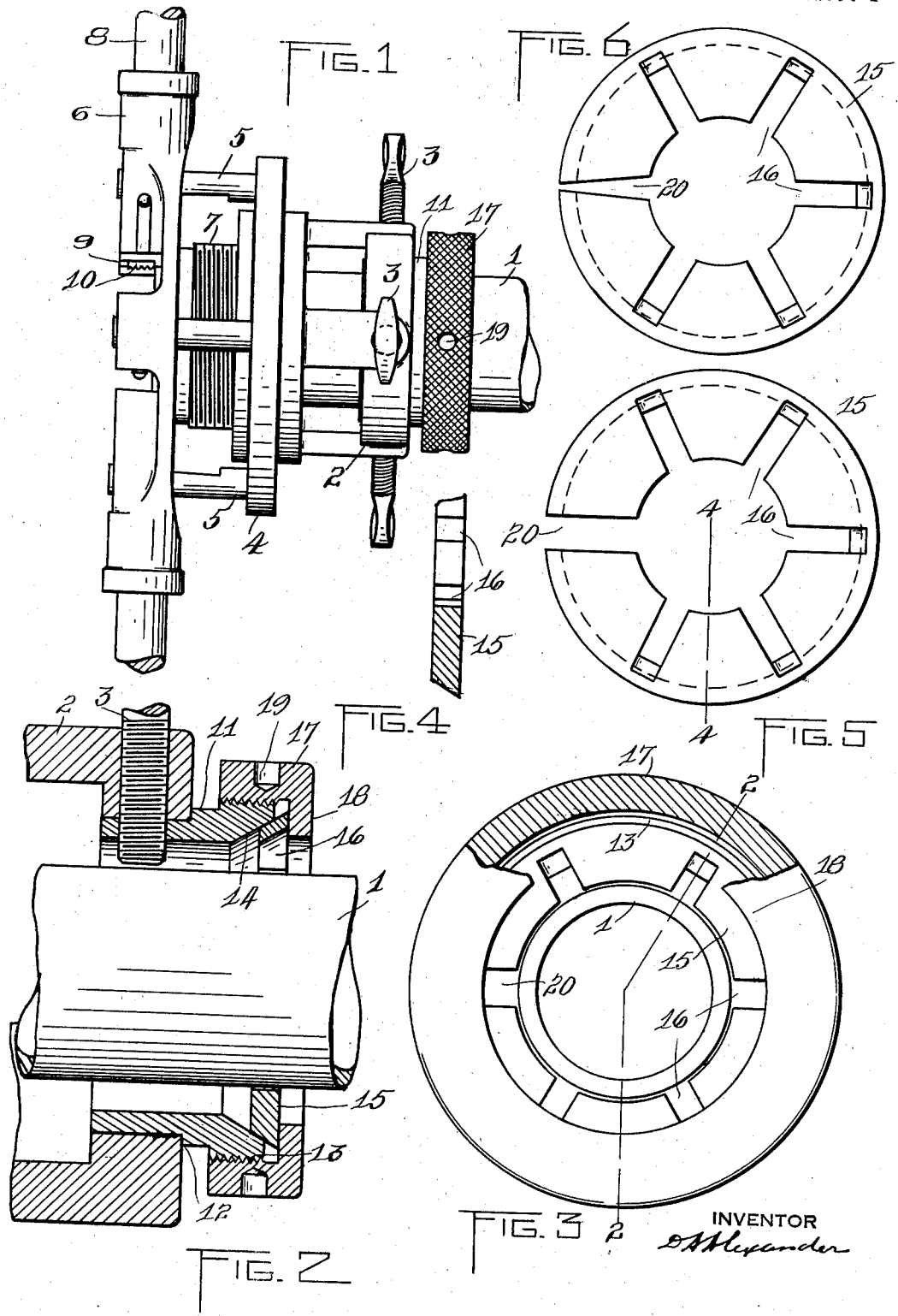

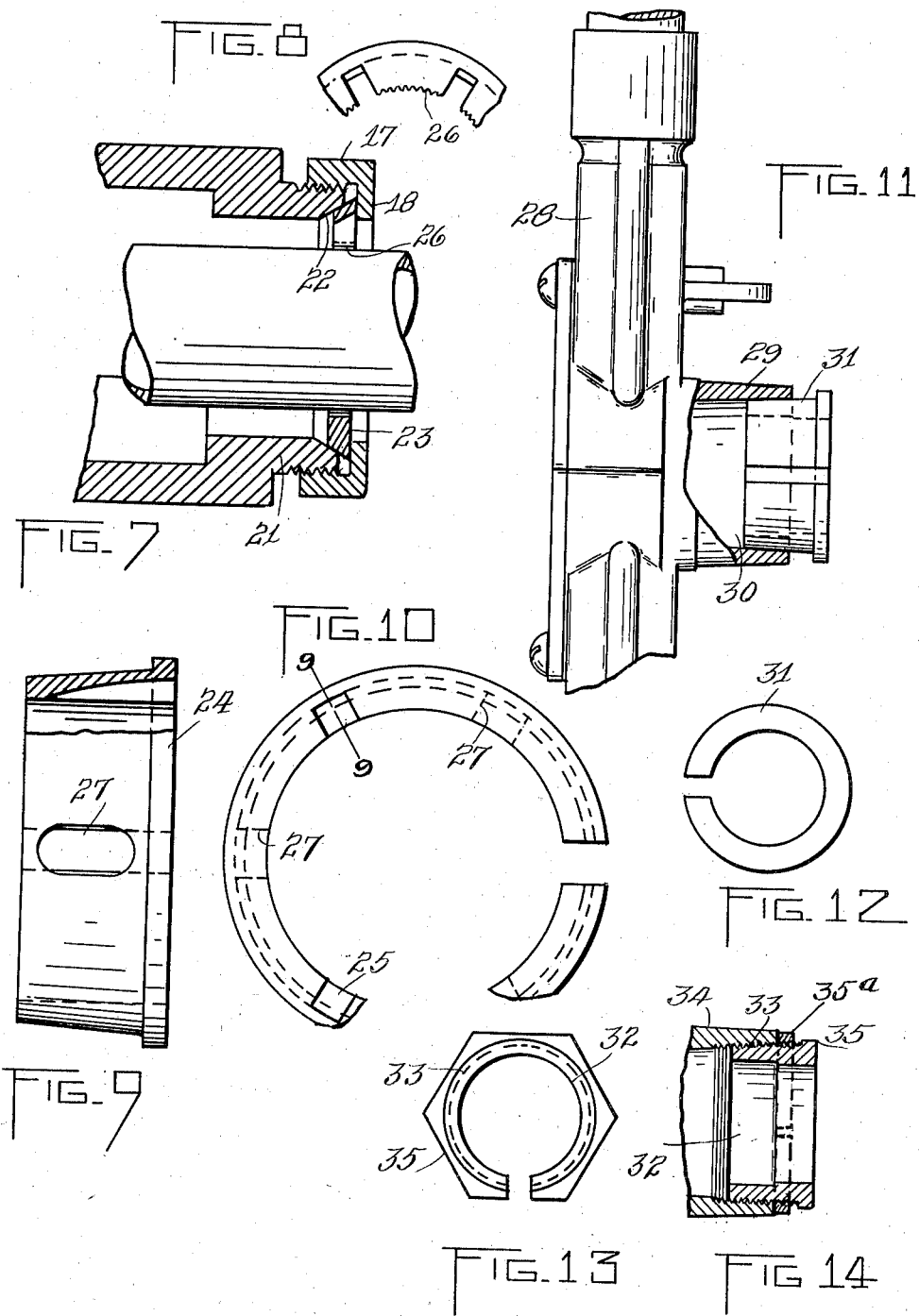

2,198,693

UNITED STATES PATENT OFFICE 2,198,693

PIPE STOCK

David A. Alexander, Rochester, N. Y.

Application November 9, 1937, Serial No. 173,588

5 Claims. (Cl. 10—107)

The present invention relates to pipe threading devices and, more particularly, to a detachable and manually adjustable means co-operating with tools of this character for centering the pipe and holding it in true axial alignment with the cutting dies during the threading operation.

These threading devices or pipe stocks, as they are commonly termed, are provided with interchangeable bushings for receiving and guiding water, gas and steam pipe. The outside diameter of such pipe, however, for a given size, often varies considerably and as the outside and inside diameters of the bushings are parallel to the axis of the tool, with clearance allowed on the inside diameter for receiving over-sized pipe and, on the outside, for easy insertion of the bushing into the stock, it is necessary to provide means for centering the pipe, otherwise, and as frequently occurs unless such centering is accurate, the pipe thread is cut crooked.

The means now generally employed for centering pipe in a stock is a three-point bearing comprising thumb screws threaded radially through the stock tail piece and of the guide bushing, and which also comprises a means for holding the stock proper and pipe against relative axial movement in the threading operation. However, setting these screws is mere guess work depending upon the accuracy of the eye and is usually so inaccurate that the expediency of wrapping foil or paper around the pipe to take up the clearance is often resorted to.

To overcome this possibility of the pipe thread not being cut straight and, also, the necessity of resorting to improvised devices for centering the pipe is the main object of the invention.

Another purpose of the invention is to accomplish the aforesaid object by means of a self-centering guide comprising a split bushing having a tapered outer peripheral surface co-operating with a correspondingly tapered inner surface of the pipe stock tail piece to effect a contraction or expansion of the bushing to engage or disengage the pipe accordingly as it is moved, respectively, in one direction or the other axially of the pipe.

Another object of the invention is, in one modification thereof, to provide a guide bushing of the character just above described and a manually operable follower movable axially on the pipe stock tail piece and engaging the bushing to effect contraction of the latter until its inner diameter approximately coincides with the outer diameter of the pipe.

Another object of the invention is to make the device adaptable for use with different types of pipe stocks such, for instance, as the one in which the tail portion is clamped to the pipe and the head portion carrying the dies is movable axially on the pipe, and to another type in which the entire stock is movable on the pipe.

For each stock there would be provided, in one modification of the invention, a set of split guide bushings or adapters for pipe of different sizes, these bushings being slotted radially outward from their inner diameter so as to weaken the wall and permit flexing thereof, and it is a still further object to so arrange these slots and the alternating segmental sections that, when the slit in the bushing is approximately closed and with the inner diameter reduced to that of the outer diameter of the pipe, the radial slots will be equally spaced and all bearing points on the outer and inner diameters in true concentricity to the axis.

Another object is to provide the invention either in the form of a long or a short bushing and, in either event, to so relatively proportion the alternating slots or spaces and segmental bearing portions as to obtain the desired true concentricity, strength and flexibility of the bushing.

Another object of the invention, when embodied in a long bushing, is to make provision for non-interference with the use of the usual set screws for holding the pipe.

Another object of the invention is to provide in a still further modification, a split eccentric within the split bushing whereby the pipe may be held at a predetermined angle to the axis of the cutting dies for the purpose of forming a pitch or crook thread, the eccentric being the pipe holding member.

Another object of the invention is to provide a centering device of the character and for the purpose described that may be adapted to pipe stocks now in use without requiring alteration of the stocks.

And, a still further object of the invention is the provision of a self-centering means for the purpose set forth that will be inexpensive to manufacture, of practical construction, efficient in operation, and which will, besides producing more accurate work, save time and annoyance to the operator.

The accompanying drawings illustrating the invention and forming a part of the specification are as follows:

Figure 1 shows in side elevation one form of the invention as embodied in the type of pipe stock in which the tail piece is held to the pipe and the die-carrying head only moves on the pipe in the threading operation.

Figure 2 is a sectional view through the tail portion of the stock shown in Fig. 1 with the section through the pipe centering device being as on line 2—2, Fig. 3.

Fig. 3 is an end view of the parts shown in Fig. 2 with the exception of the tail portion of the stock, and with the adjusting member partly broken away.

Fig. 4 is a sectional detail on line 4—4, Fig. 5.

Figs. 5 and 6 are end views of the split bushing or adapter shown, respectively, as expanded and contracted.

Fig. 7 is a fragmentary sectional view similar to Fig. 2 but showing a modification of the invention in which the outer bushing is eliminated.

Fig. 8 shows in end view a fragmentary segmental portion of the adapter seen in Fig. 7.

Figs. 9 and 10 are views in side and end elevation, respectively, of a modified form of bushing intended for use without the manually adjustable follower, part of Fig. 9 being in section on line 9—9, Fig. 10.

Fig. 11 shows in side elevation a modification of the invention somewhat similar to that shown in Figs. 9 and 10, the bushing being shown in a pipe stock of the type which is bodily movable on the pipe in the threading operation.

Fig. 12 is an end view from the right of the bushing seen in Fig. 11.

Fig. 13 is an end view from the left of the modified form of bushing shown in Fig. 14.

Fig. 14 is a central sectional detail view of the bushing seen in Fig. 13 and a fragmentary sectional view of the stock tail piece into which the bushing is threaded.

Fig. 15 is an end view of a modification of the invention, a part being shown in section, and so formed as to prevent marring of the pipe by the set screws used in conjunction therewith.

Fig. 16 is a longitudinal sectional detail of the bushing shown in Fig. 15, as will be explained.

Fig. 17 is a fragmentary plan view of the bushing seen in Fig. 15.

Fig. 18 is an end view and Fig. 19 a side elevation of still another modification of the invention, a portion of pipe also being shown in these views.

Fig. 20 shows in end view a still further modification of the invention adapted to support the pipe at a predetermined angle, and Fig. 21 is a sectional view on line 21—21, Fig. 20.

In the drawings similar reference numerals refer to similar parts throughout the several views.

Referring first to Figs. 1 to 6, inclusive, numeral 1 represents the pipe to be threaded, the pipe stock, in this instance, consisting of three main parts, viz;—the rear portion or pipe holder 2, held tight to the pipe by means of a plurality of, in this instance three, regularly circumferentially spaced thumb screws 3 which provide a three-point bearing for the pipe; a middle portion or taper pin plate 4 which carries a series of circumferentially arranged posts or pins 5, each of the latter having a tapering surface corresponding to the standard pipe thread taper; and a front portion or die head 6 having a lead screw 7 which is threaded into a corresponding lead screw in the pipe holder 2.

In operation, the die head 6 is rotated by grasping the radial handles 8 and carries with it the taper pin plate 4 and its series of pins 5, these pins projecting through corresponding holes in the die head 6 which are at the outer ends of a series of radial slots 9 containing the die segments 10. These die segments 10 are radially movable in their respective slots, the rear ends thereof bearing against the tapering surfaces of the pins 5. The tool is put on a pipe 1 and the rear portion is clamped to the pipe by means of the thumb screws 3. Then the die head is rotated in the customary manner, the lead screw 7 pulling the die head onto the pipe and as such head moves axially on the pipe the rear ends of the cutting dies travel along the tapered surfaces of the pins 5 and cause the dies, which during this time are cutting the thread, to produce a thread of standard taper on the pipe.

The rear portions 2 of pipe stocks, such as just above described, are usually adapted to receive an outer bushing 11 which, when removed, permits the insertion of a pipe coupling into the stock, and an inner interchangeable bushing for holding and guiding the pipe. Owing, however, to the variation in the outer diameter of pipe of a given size, the bore of the inner bushing is such as to provide plenty of clearance, this clearance being taken up by the thumb screws 3 which are threaded through aligned openings in the stock portion 2 and the bushings. These screws provide a three-point bearing for the pipe and should be so adjusted as to properly center it. But, in most instances such centering is inaccurate and the consequent result is a crooked thread on the pipe.

In the present invention the outer bushing 11, see Figs. 1, 2 and 3, has threaded radial openings for receiving the thumb screws 3 and projects outwardly or in rear of the holder portion 2 of the stock, such projecting part preferably being of enlarged diameter and having a shoulder 12 bearing against the stock. This projecting portion of the bushing is threaded externally at 13 and has the outer end of its inner periphery tapered at 14 for receiving the correspondingly tapered or inclined outer periphery of a comparatively thin or short bushing 15 comprising an adapter or centering means the bore of which is of slightly greater diameter than that of the pipe to be threaded. This centering means is formed with a plurality of slots 16 extending radially from the bore for the purpose of weakening the bushing and permitting it to flex when moved axially.

For effecting an inward or operative movement of the bushing 15 a collar 17 comprising a follower member is threaded on the projecting portion of the outer bushing 11 and has an inwardly turned annular flange 18 which engages the bushing 15, this follower member being adjusted, in this instance, by means of a spanner wrench engaging in radial openings 19 therefor. Inward movement of the collar 17 effects an axial movement of the bushing 15 along the inclined surface 14 and a consequent contraction of such bushing until the bore thereof is reduced to the approximate diameter of the pipe 1, whereupon the bushing not only becomes a means for holding the pipe but, also, effects a true centering thereof with respect to the axis of the dies.

For all practical purposes the radial slots 16 may be evenly spaced with respect to the circumference of the bushing 15 before contraction of the latter. This, if the slots were formed by a milling cutter, would be the more simple and practical construction. Theoretically, however, and in order that the outer and inner peripheral surfaces of the bushing will be absolutely concentric to the axis thereof, the circumferential measurement less the width of the slit 20, see Fig. 5, is divided equally and the slots 16 so arranged that their median lines will intersect such divisional points. Thus, should there be an even number of slots the opposite ones will not be in diametrical alignment when the slot 20 is open, as in Fig. 5, but will move into such alignment on contraction of the bushing, as illustrated in Fig. 6. The outer diameter being greater in the normal condition of the bushing, Fig. 5, than when such member is contracted, Fig. 6, and the cords between slots not being reduced as the bushing is contracted, the bushing, as it is reduced in diameter by axial movement, will, with the slots arranged as in Fig. 5, have a six point bearing on the inclined surface 14, such points being where the median lines of the slots intersect the circumferential surface.

In the modification of the invention illustrated in Figs. 7 and 8, the outer bushing is eliminated and a projecting portion 21 on the pipe holder portion of the stock is threaded externally to receive the follower 17, and the bore of such extension has a tapered surface 22 for receiving the pipe holding bushing and centering means 23.

In Figs. 9 and 10 there is shown a modification of the centering device in which such member comprises an elongated split bushing 24 having radial slots 25 permitting such member to flex, and having a tapered circumferential surface adapted to cooperate with a corresponding surface on the part into which it is fitted for axial movement. This bushing is adapted to be driven into the stock to contract its bore to the size of the pipe, and pried out when it is to be disengaged from the pipe or removed for the substitution of one of a different size bore. The bushing 24 is shown as having slots 27 for receiving the thumb screws 3, these slots being of such length as to permit axial adjustment of the bushing.

As indicated in Fig. 7, the thumb screws 3 may be eliminated and the holding and centering member 23 serrated, as shown at 26 in Figs. 7 and 8, to grip the pipe 1 and hold the latter and the tail portion of the stock against relative axial movement during the threading operation.

Fig. 11 shows a pipe stock of the type in which the entire tool, indicated generally by the numeral 28, is movable axially on the pipe during the threading operation. The rear portion 29 of the tool is shown as having a tapered bore 30 adapted to receive a correspondingly tapered bushing or pipe centering member 31 similar to that shown in Figs. 9 and 10. In this instance, however, the slots 27 are not employed as no holding thumb screws are required, and the bushing, although split, is not formed with radial slots.

Instead of being driven into the stock the split bushings, as shown in Figs. 9, 10, 11 and 12, may, as illustrated in Figs. 13 and 14 at 32, have a tapered thread 33 adapted to engage a correspondingly internally tapered thread formed on the tail portion 34 of the stock, such type of bushing having a head 35 conformed to be engaged by a wrench for screwing the bushing in to and out of the stock.

In the modification of the invention shown in Figs. 15, 16 and 17 the split bushing indicated at 36 is provided with a plurality, in this instance three, of regularly spaced longitudinally extending bars or bosses 37 formed with outwardly opening pockets 38 adapted to receive the thumb screws 3 hereinbefore referred to. These bars project both radially outward and inward fom the flexible connecting band or bushing proper 36 and each has a tapered surface 39 forming a segmental portion of an external peripheral surface which, when the bushing is inserted in a pipe stock, engages the cooperating tapered internal peripheral surface of the stock to effect contraction of the bushing. The curved inner surfaces of the bars 37 contact the pipe and when the bushing is contracted are in true concentricity. This type of bushing is intended more particularly for use on pipe having a polished surface, the screws 3 seating against the bottoms of the pockets 38 being thus prevented from marring or otherwise injuring such finished surface.

The illustrated, and one of the preferred, embodiments of the invention shown in Figs. 18 and 19 is of the general construction seen in Figs. 15, 16 and 17 with the exception that, in this instance, the slot or split 40 in the bushing is through a doublewidth one of a plurality of longitudinally extending bars 41, the outer surfaces 42 of which are inclined and the inner faces 43 curved for the same reasons as described with reference to the bars 37 of Figs. 15, 16 and 17. In this construction flexibility of the bushing is provided by the connection between the bars 41 which comprises spaced circumferentially extending band portions 44, the spaces 45 between which permit setting of the thumb screws 3 against the pipe without interference with adjustment of the bushing.

A still further modification of the invention permits a crook thread of a predetermined pitch to be cut on the pipe. To this end, a collar or comparatively thin split bushing 46, similar in cross section to that shown in Fig. 18 with the exception that the bore 47 is eccentric, is seated for rotary adjustment in the eccentric counterbore 48 in the head 49 of a split bushing 50 adapted to be inserted in the pipe stock and having an inclined outer peripheral surface 51 which when engaging a correspondingly inclined or tapered surface in the relative axial movement of the two members effects contraction or permits expansion of the two bushings accordingly as such movement is in one direction or the other. This modification of the invention is illustrated in Figs. 20 and 21, the collar 46, it will be observed, being the guiding or pipe supporting member, and the bushing 50 having openings 52 to receive and permit functioning of the thumb screws 3. The bore 47 is so formed as to allow a tilting of the pipe 1, the engaging peripheral surfaces of the collar 46 and counterbore 48 are so formed as to hold the collar against axial displacement, and the faces of the eccentric members have index markings whereby this double eccentric may be set to hold the pipe at such an angle to the axis of the cutting dies that a thread of a predetermined pitch will be cut on the pipe.

From the foregoing it will be observed that there has been provided, in different modifications, a simple, practical and inexpensive means for accurately centering and holding the pipe in pipe stocks, and that such means will not only overcome all possibility of the thread not being straight, when a straight thread is desired, but will save time and annoyance to the operator and obviate the necessity of trying to center the pipe by the eye or using improvised devices for effecting such result.

The several modifications of self-centering pipe engaging bushings, with the exception of that shown and described with reference to Figs. 13 and 14, are movable axially in the direction to permit their expansion by any suitable prying or driving instrument. It may be stated further that the bushings are bored to true pipe size when closed or under compression and that, consequently, such openings are not true circles when the bushings are expanded or in open position.

What I claim is:

1. The combination with a pipe stock including a pipe holding portion, an outer bushing within said holding portion, and set screws threaded radially through said holding portion and said outer bushing, of an inner split bushing within said outer bushing comprising a means for centering the pipe, means for moving said inner bushing axially, and cooperating inclined surfaces on said bushings for effecting contraction and permitting expansion of said inner bushing when the latter is moved axially in one direction or the other, the arrangement of said inner bushing permitting engagement of said set screws with the pipe.

2. A combination as recited in claim 1 characterized by said means for moving said bushing axially being a follower threaded on the outer bushing and engaging an end of said inner bushing to move the latter in a direction to contract it.

3. The combination with a pipe stock, including cutting dies for engaging the pipe, a pipe holding portion and means, as set screws, threaded through said holding portion for holding the pipe against axial movement, of means for centering the pipe with respect to said dies or holding it at a predetermined angle to the axis thereof, for the purpose set forth, including an outer split bushing having an eccentric bore and a rotatably adjustable inner split bushing also having an eccentric bore, the inner bushing being the pipe engaging member and having an inner peripheral surface permitting angular movement of the pipe with said dies acting as a fulcrum, and cooperating inclined peripheral surfaces on the outer bushing and said pipe holding portion for effecting contraction of the two bushings on their axial movement in one direction and permitting expansion of the bushings on their movement in the opposite direction, said bushings being so formed and relatively arranged as to permit contact of said set screws with the pipe.

4. A combination as recited in claim 3 and characterized by said inner bushing comprising a split flexible collar seated in an eccentric counterbore in the outer bushing, and by said bushings having index markings on the faces thereof for the purpose set forth.

5. The combination with a pipe stock including cutting dies for circumferentially engaging the pipe, a pipe holding portion and set screws threaded radially through the holding portion to hold the pipe against axial movement, of a split bushing for centering the pipe with respect to said dies and having elongated slots for receiving said set screws, and cooperating inclined surfaces on said bushing and said holding portion for effecting contraction and permitting expansion of the bushing, said bushing being manually driven axially into and out of operative position.

DAVID A. ALEXANDER.